(12) United States Patent
Henningsgard et al.

(10) Patent No.: US 11,541,742 B2
(45) Date of Patent: Jan. 3, 2023

(54) MOBILE OMNIDIRECTIONAL DEVICE

(71) Applicant: Northern Valley Machine Inc., East Grand Forks, MN (US)

(72) Inventors: Keith Henningsgard, Oslo, MN (US); Frank Walski, East Grand Forks, MN (US); Paul Olson, Orlando, FL (US)

(73) Assignee: Northern Valley Machine Inc., East Grand Forks, MN (US)

( * ) Notice: Subject to any disclaimer, the term of this patent is extended or adjusted under 35 U.S.C. 154(b) by 514 days.

(21) Appl. No.: 16/684,821

(22) Filed: Nov. 15, 2019

(65) Prior Publication Data

US 2020/0156459 A1 May 21, 2020

Related U.S. Application Data (60) Provisional application No. 62/768,333, filed on Nov. 16, 2018.

(51) Int. Cl.

| | | |
|---|---|---|
| *B60K 7/00* | (2006.01) |
| *B60L 53/14* | (2019.01) |
| *B60L 53/50* | (2019.01) |
| *B60P 1/02* | (2006.01) |
| *G05D 1/00* | (2006.01) |
| *B62D 11/04* | (2006.01) |
| *B66C 23/46* | (2006.01) |
| *B60B 19/00* | (2006.01) |

(Continued)

(52) U.S. Cl.
CPC ............ *B60K 7/0007* (2013.01); *B60L 53/14* (2019.02); *B60L 53/50* (2019.02); *B60P 1/02* (2013.01); *B62D 11/003* (2013.01); *B62D 11/04* (2013.01); *B66C 23/46* (2013.01); *G05D 1/0016* (2013.01); *B60B 19/003* (2013.01); *B60B 19/12* (2013.01); *B60K 2007/0061* (2013.01); *B66C 2700/0378* (2013.01); *G05D 2201/02* (2013.01)

(58) Field of Classification Search
CPC ......... B60B 19/003; B60B 19/12; B60K 1/04; B60K 17/043; B60K 17/354; B60K 17/356; B60K 2001/0438; B60K 2007/0038; B60K 2007/0061; B60K 2007/0092; B60K 7/0007; B60L 2200/40; B60L 50/60; B60L 53/14; B60L 53/50; B60P 1/02; B62D 11/003; B62D 11/04; B62D 15/00; B66C 23/46; B66C 2700/0378; B66F 9/065; B66F 9/07531; B66F 9/07577; B66F 9/07581; B66F 9/18; G05D 1/0016; G05D 2201/02; Y02T 10/70; Y02T 10/7072; Y02T 90/12; Y02T 90/14
See application file for complete search history.

(56) References Cited

U.S. PATENT DOCUMENTS 4,718,564 A     1/1988 Bailey
7,468,587 B2 *  12/2008 Shkondin ................ B60L 50/52
                                          310/148

(Continued)

*Primary Examiner* — Tyler J Lee
(74) *Attorney, Agent, or Firm* — Vidas, Arrett & Steinkraus PA; Richard Arrett; Edwin E. Voigt, II (57) ABSTRACT

A mobile omnidirectional device having a base support, four wheels pivotally connected to the base support, each wheel being driven by a drive motor, a controller for individually controlling each of the drive motors, and a power source for powering the controller and the drive motors. The device provides a zero inch turning radius and can be configured as a jib hoist or a rolling transportation cart.

19 Claims, 15 Drawing Sheets

(51) Int. Cl.
   *B60B 19/12*   (2006.01)
   *B62D 11/00*   (2006.01)

(56) References Cited

U.S. PATENT DOCUMENTS

| | | | | |
|---|---|---|---|---|
| 9,052,165 | B1* | 6/2015 | Rogers | B60R 16/00 |
| 10,358,040 | B1* | 7/2019 | Keller | B60K 11/02 |
| 10,391,854 | B1* | 8/2019 | Keller | B62D 11/04 |
| 2008/0211432 | A1* | 9/2008 | Shkondin | B60L 50/52 |
| | | | | 318/140 |
| 2008/0217277 | A1 | 9/2008 | Spitsbergen | |
| 2010/0206647 | A1* | 8/2010 | Ishii | B62D 9/00 |
| | | | | 180/6.24 |
| 2013/0257373 | A1* | 10/2013 | Mallon, IV | F16L 3/16 |
| | | | | 248/65 |
| 2018/0093708 | A1* | 4/2018 | Soldan | B62D 11/005 |
| 2018/0099555 | A1* | 4/2018 | Yang | B62D 7/026 |
| 2018/0192580 | A1* | 7/2018 | Zeiler | A01D 34/78 |
| 2018/0264956 | A1* | 9/2018 | Takagi | B60L 53/14 |
| 2019/0193784 | A1* | 6/2019 | Wach | B62D 7/04 |

\* cited by examiner

MOBILE OMNIDIRECTIONAL DEVICE

CROSS-REFERENCE TO RELATED APPLICATIONS

This application claims the benefit of and priority to U.S. Provisional Application No. 62/768,333, filed Nov. 16, 2018, the entire contents of which is hereby incorporated by reference.

STATEMENT REGARDING FEDERALLY SPONSORED RESEARCH

Not Applicable.

BACKGROUND OF THE INVENTION

There is a need for a small mobile device with a zero inch turning radius, which can be configured for many uses, for example as a jib hoist or a rolling transportation cart.

Without limiting the scope of the invention a brief summary of some of the claimed embodiments of the invention is set forth below. Additional details of the summarized embodiments of the invention and/or additional embodiments of the invention may be found in the Detailed Description of the Invention, below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

The invention provides several embodiments of a mobile omnidirectional device having a base support, four wheels pivotally connected to the base support, each wheel being driven by a drive motor, a controller for individually controlling each of the drive motors, and a power source for powering the controller and the drive motors.

The wheels are constructed and arranged so that the mobile omnidirectional device has a turning radius of zero inches. The power source is comprised of a plurality of batteries, for example four deep cycle batteries providing 48 VDC. A battery recharger can be provided on-board to recharge the batters when the device is connected to an AC power source. The device can be operated by a tethered control pendant or a wireless control device.

The mobile omnidirectional device can be configured for many useful tasks, for example it could be configured as a jib hoist by including a jib column attached to the base support, a pivotally attached jib rail connected to the jib column which is raised and lowered with a roller screw actuator, and wherein the controller is operably connected to the roller screw actuator to control the jib rail and jib column. The jib hoist configured device is sized to be portable, having a width of approximately 38.5 inches, a length of approximately 58 inches and a height of approximately 50 inches, and weighs approximately 1750 pounds. With the jib rail in the down position, the device is about 50 inches high, and with the jib rail in the maximum up position, the maximum hook height is approximately 78 inches high. Although the mobile omnidirectional device, configured as a jib hoist, can be used for lifting any heavy object, one use is for moving heavy chucks on and off lathes, in tight areas that forklifts cannot reach.

The mobile omnidirectional device can be configured for many useful tasks, for example it could be configured as a rolling transportation cart by including a height adjustable platform, operatively connected to the controller to raise and lower the platform. The rolling cart configuration is sized to be portable, having a width of approximately 24 inches, the height adjustable platform can adjust in height from 18 to 24 inches, and the platform can adjust its height from end to end approximately ½ inch to maintain a level platform, and the platform can carry a load of at least 2500 lbs, and weights approximately 900 pounds. While the mobile omnidirectional device, configured as a rolling transportation cart, can be used for transporting any heavy object, one use is for transporting a heavy set of rolls between a machine shop and the milling machine that requires them (and visa versa). Typically the width between the machines is quite narrow, which is why the rolling transportation version was designed to be no more than 2 feet wide.

DETAILED DESCRIPTION OF THE INVENTION

Figure 1:
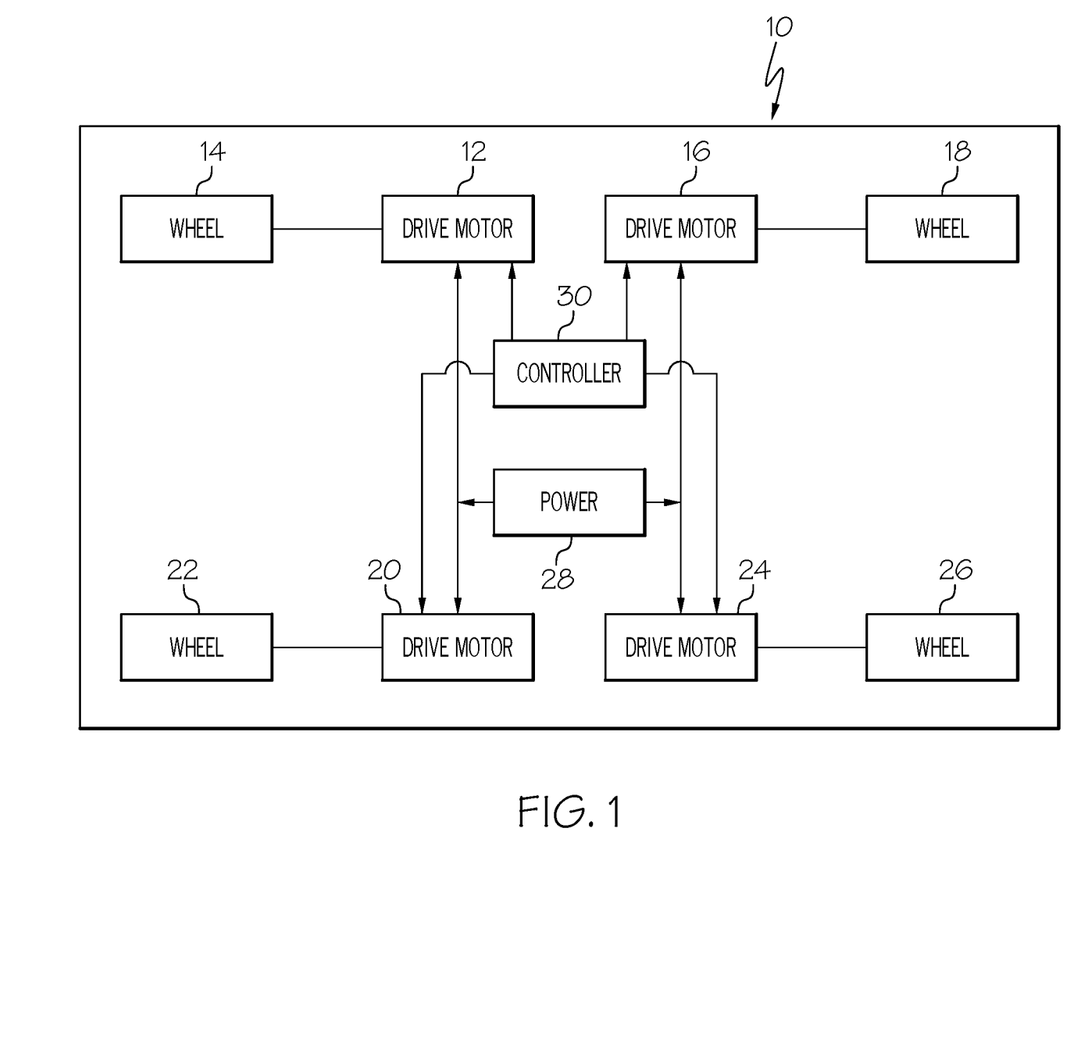
FIG. 1 shows a block diagram of the parts of the mobile omnidirectional device.

Referring now to FIG. 1, a block diagram of the parts of the mobile omnidirectional device is shown generally at 10. There are four drive motor and wheel sets, 12 and 14, 16 and 18, 20 and 22, and finally 24 and 26. The wheels can be any type of wheel, but preferably for the zero turning radius feature are Mecannum wheels which are pivotally mounted to provide continuous contact of all 4 wheels with the ground. A crossed roller bearing is used to support the pivot mount. The drive motor is semi-embedded into the Mecannum wheel, and while any drive motor can be utilized, preferably a custom frameless servo is used. The wheels and drive motors are connected to a base support, discussed further below. Power to drive the motors and wheels is provided at 28, and as described in more detail below, is preferably four 12 volt batteries with an included recharger.

The controller which operates the mobile omnidirectional device is shown at 30, and can be operated with a tethered pendant controller or a wireless remote control device. In the preferred embodiment the operator walks behind the device using the wired tethered pendant controller to operate the device.

Figure 2:
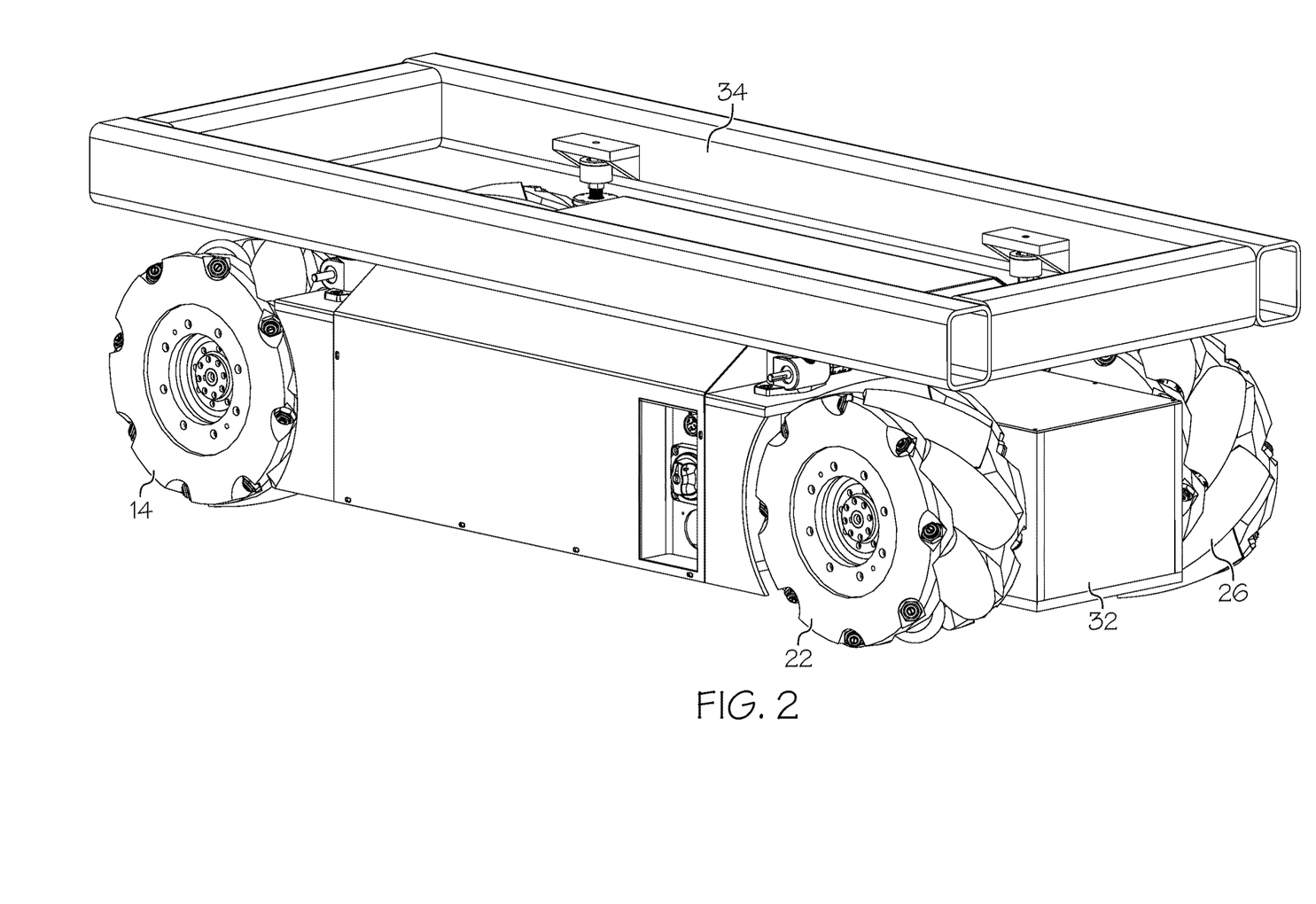
FIG. 2 shows a side perspective view of the device of FIG. 1, configured as a rolling transportation cart.

FIG. 2 shows a side perspective view of the device of FIG. 1, configured as a rolling transportation cart. Because the rolling transportation cart is only 2 feet wide, a narrower Mecannum wheel is used than for the jib hoist embodiment discussed below in connection with FIG. 3. The base support is shown at 32, and support the components of the device, such as the wheels, motors, batteries and so forth. A height adjustable frame 34 is attached to the device, and a pair of lift actuators are provided for lifting the frame 34 from a height of 18 to 24 inches, although any desired height could be provided. Alignment couplers attached to the lift actuators also permit the end to end height to be adjusted by up to ½ inch to maintain a level platform, which is attached to the frame (not shown in FIG. 2.

Figure 3:
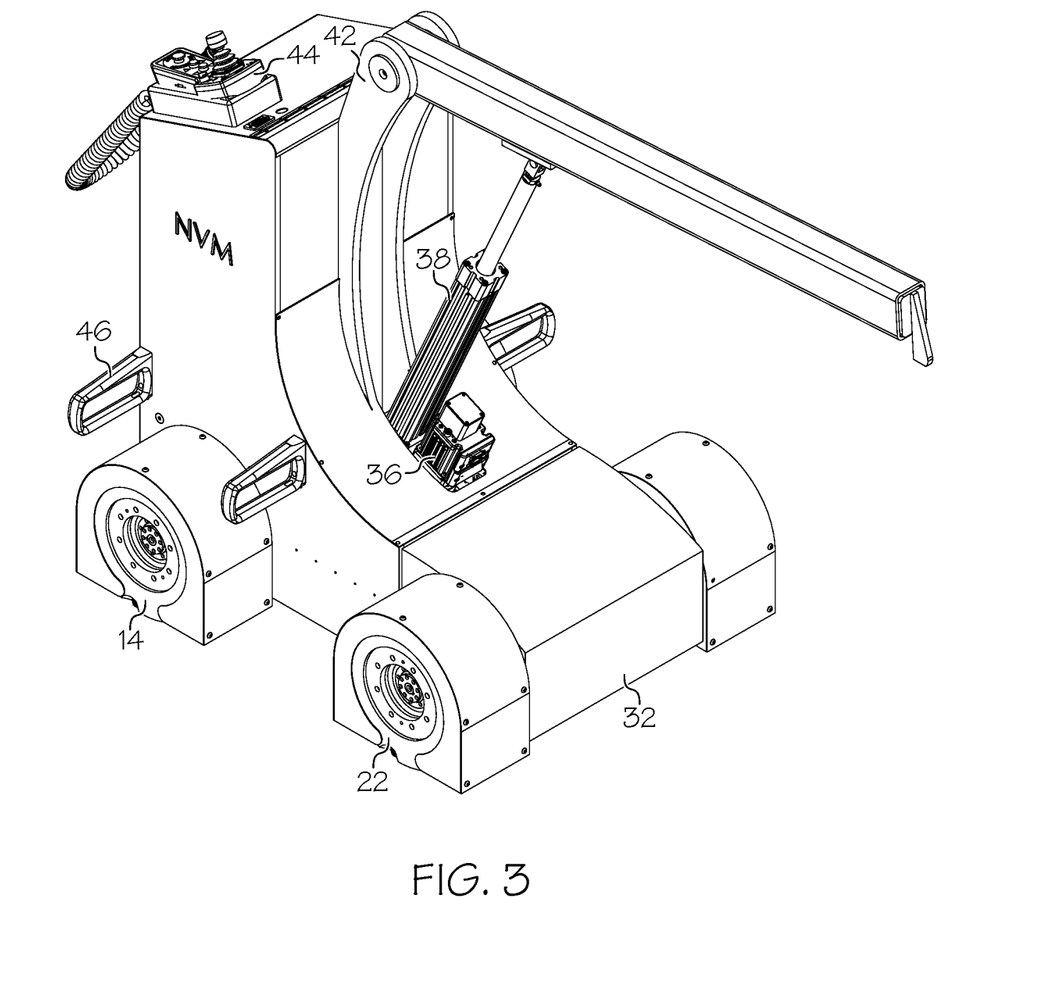
FIG. 3 shows a side perspective view of the device of FIG. 1, configured as a jib hoist.

FIG. 3 shows a side perspective view of the device of FIG. 1, configured as a jib hoist. The jib hoist embodiment provides a lift motor 36, which can be any commercially available lift motor, but preferably a Kollmorgen servo is used. The lift motor 36 drives a lift actuator 38, which can be any commercially available lift actuator, but is preferably a Tolomatic roller screw device. The lift actuator 38 is connected to the jib rail 40, which is pivotally connected to a jib column 42. The jib hoist is operated by the tethered pendant controller 44, which drives the device and operates the jib hoist. A set of four handles 46 are attached to the device 10 to lift the device for portability purposes. The jib hoist configured device is sized to be portable, having a width of approximately 38.5 inches, a length of approximately 58 inches and a height of approximately 50 inches, and weighs approximately 1750 pounds. With the jib rail in the down position, the device is about 50 inches high, and with the jib rail in the maximum up position, the maximum hook height is approximately 78 inches high.

Figure 4:
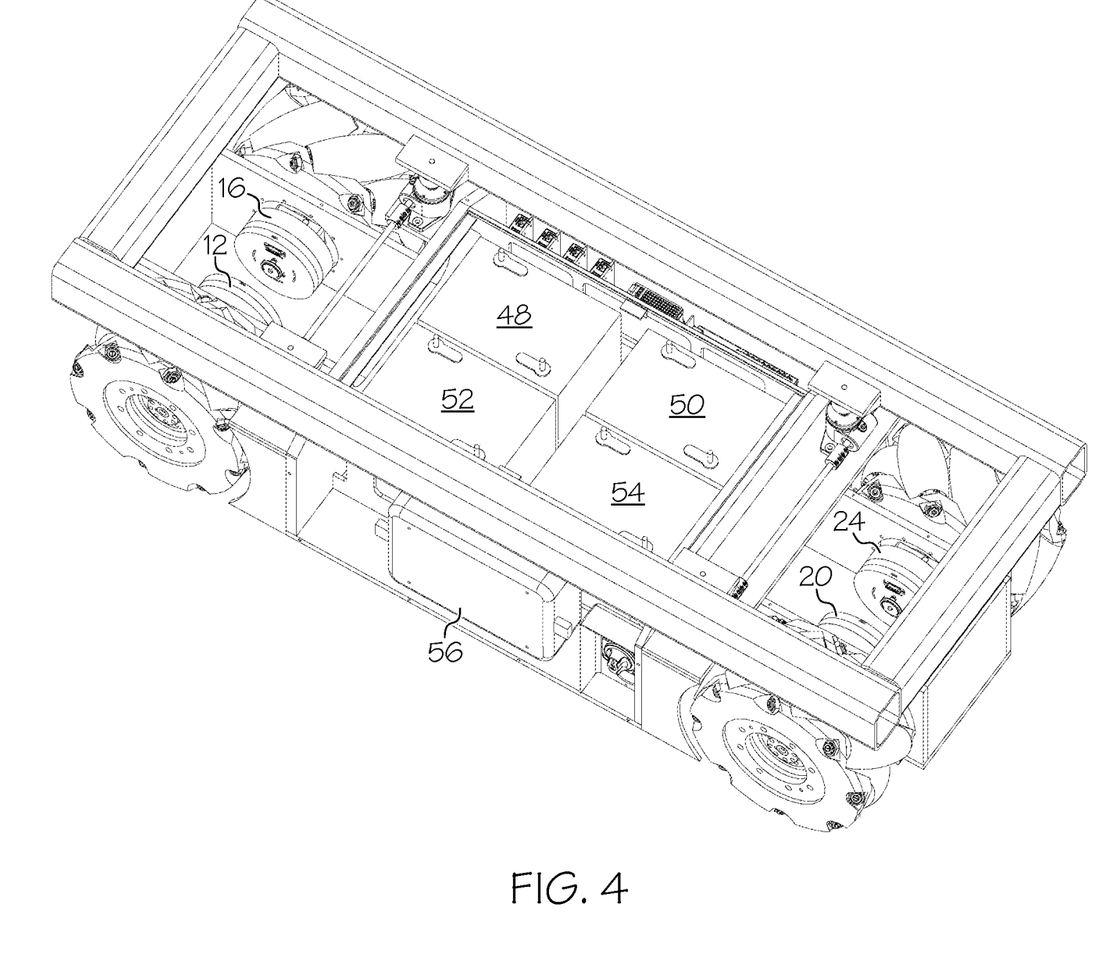
FIG. 4 shows a top perspective view of the rolling transportation cart embodiment.

FIG. 4 shows a top perspective view of the rolling transportation cart embodiment, which the batteries arranged on the base support at 48, 50, 52 and 54. The four 12 volt batteries provide 48 VDC and can operate the device continuously for at least 4 hour minimum, before needing to be recharged via recharger 56. Servo motors 12, 16, 20 and 24 are narrower, and together with the narrower wheels allow the rolling transportation cart embodiment to have a width of 24 inches or less.

Figure 5:
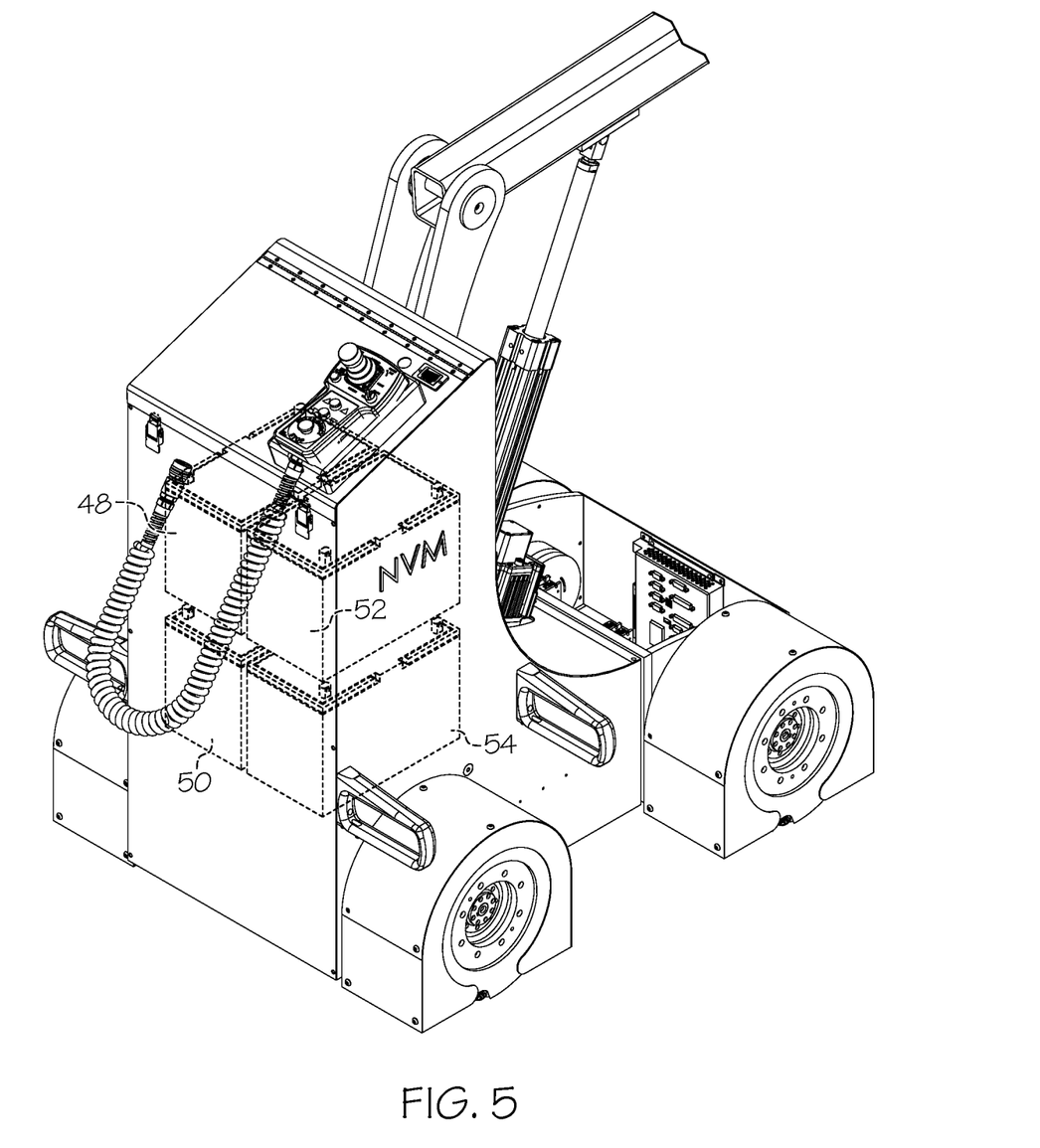
FIG. 5 shows a top and side perspective view of the jib hoist embodiment.

FIG. 5 shows a top and side perspective view of the jib hoist embodiment. In this embodiment, the batteries 48, 50, 52 and 54 are stacked at the back end of the device.

Figure 6:
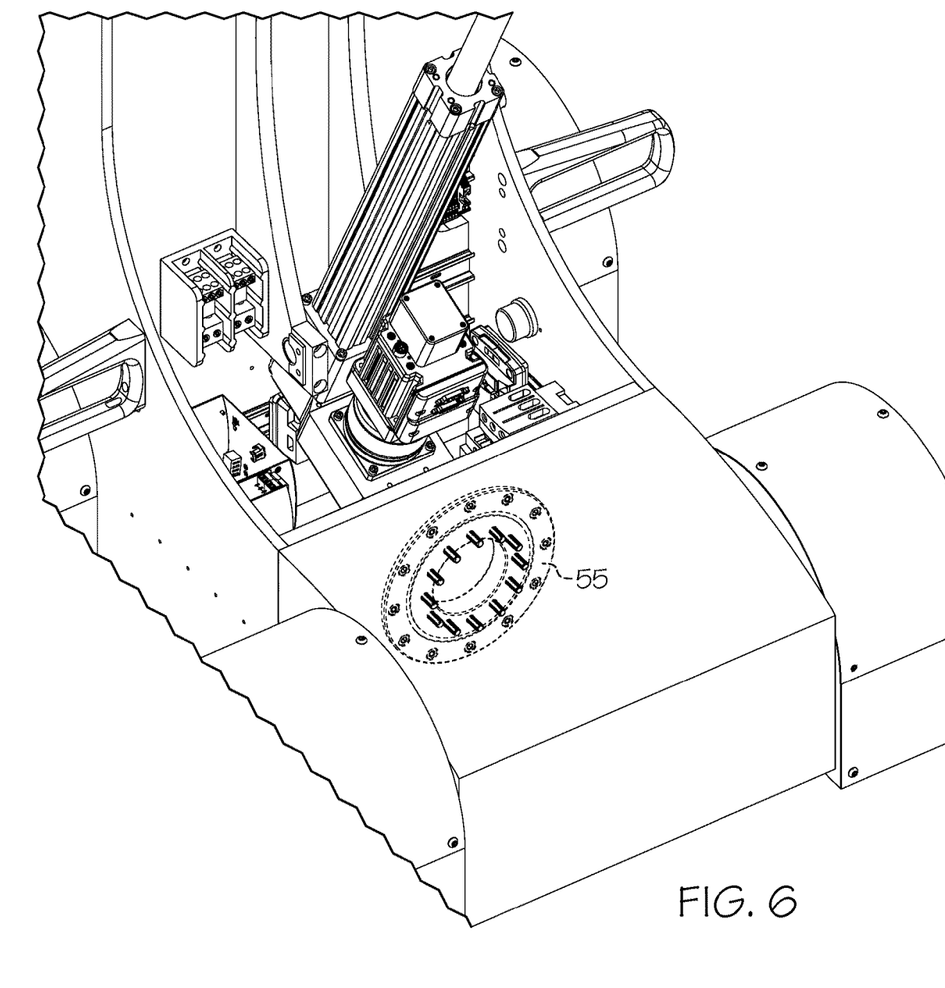
FIG. 6 shows the jib hoist embodiment with parts shown schematically.

FIG. 6 shows the jib hoist embodiment with parts shown schematically. 55 shows the crossed pivot roller bearing.

Figure 7:
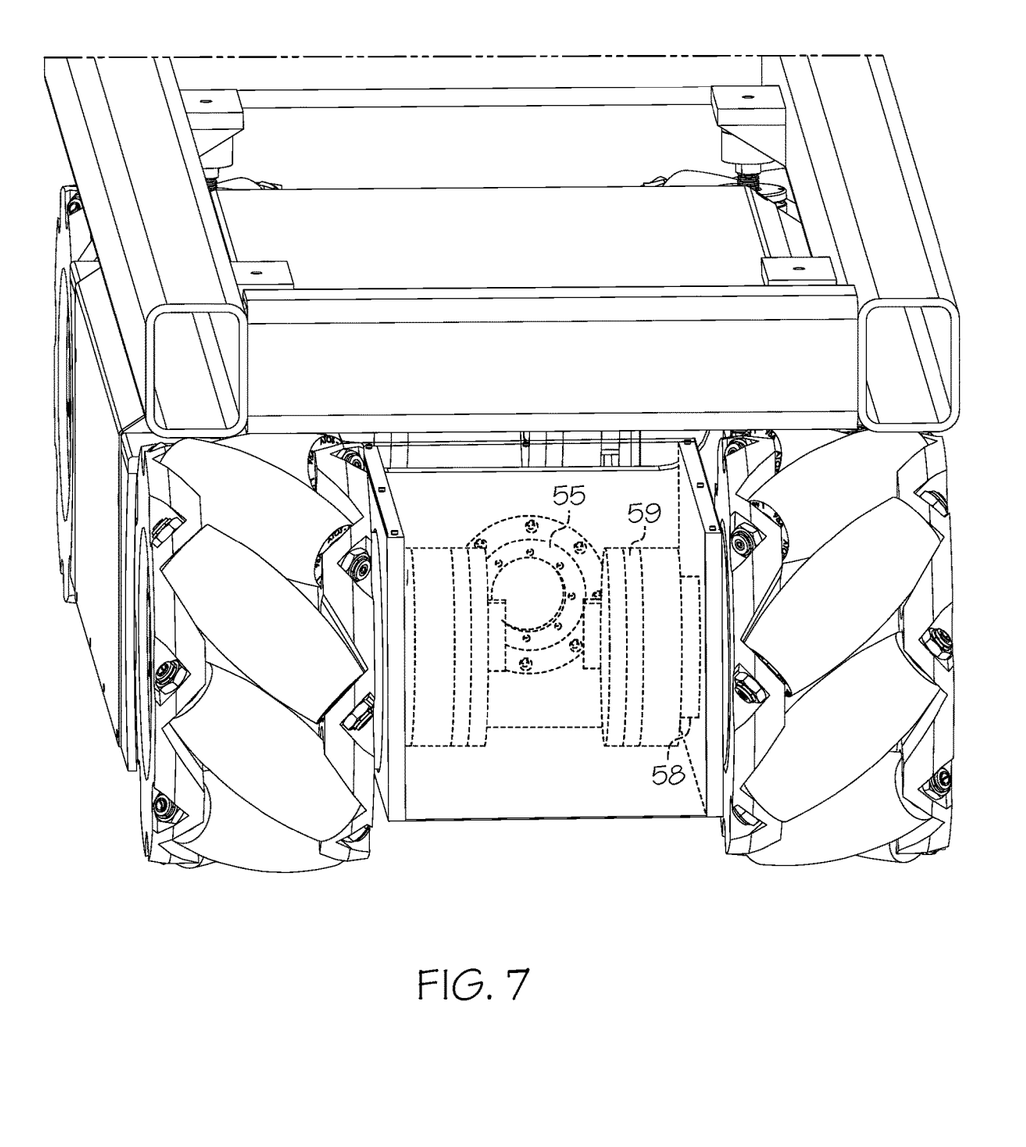
FIG. 7 shows the rolling transportation cart embodiment with parts shown schematically.

FIG. 7 shows the rolling transportation cart embodiment with parts shown schematically. 55 is the crossed pivot roller bearing. 58 is the gearbox and 59 is the drivetrain hub.

Figure 8:
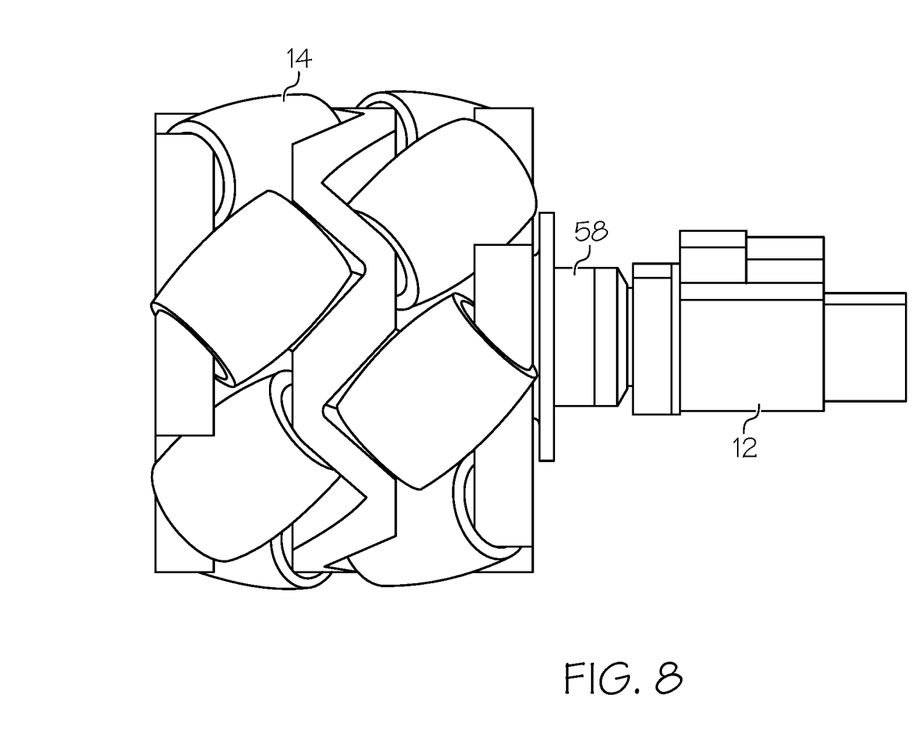
FIG. 8 shows the wider jib hoist wheel and drivetrain.

FIG. 8 shows the a jib hoist wheel 14, which is a two roller wide version of the Mecannum wheel, the gearbox 58 and the drive motor 12.

Figure 9:
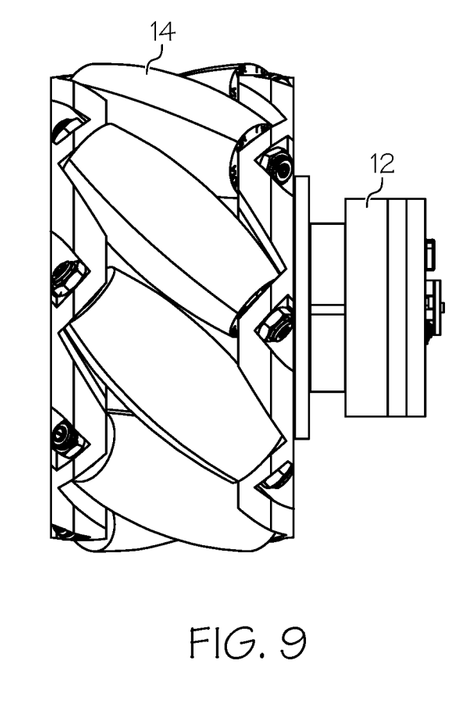
FIG. 9 shows the narrower rolling transportation cart wheel and partially embedded drivetrain.

FIG. 9 shows a rolling transportation wheel 14, which is a single roller wide version of the Mecannum wheel and the custom frameless servo motor 12.

Figure 10:
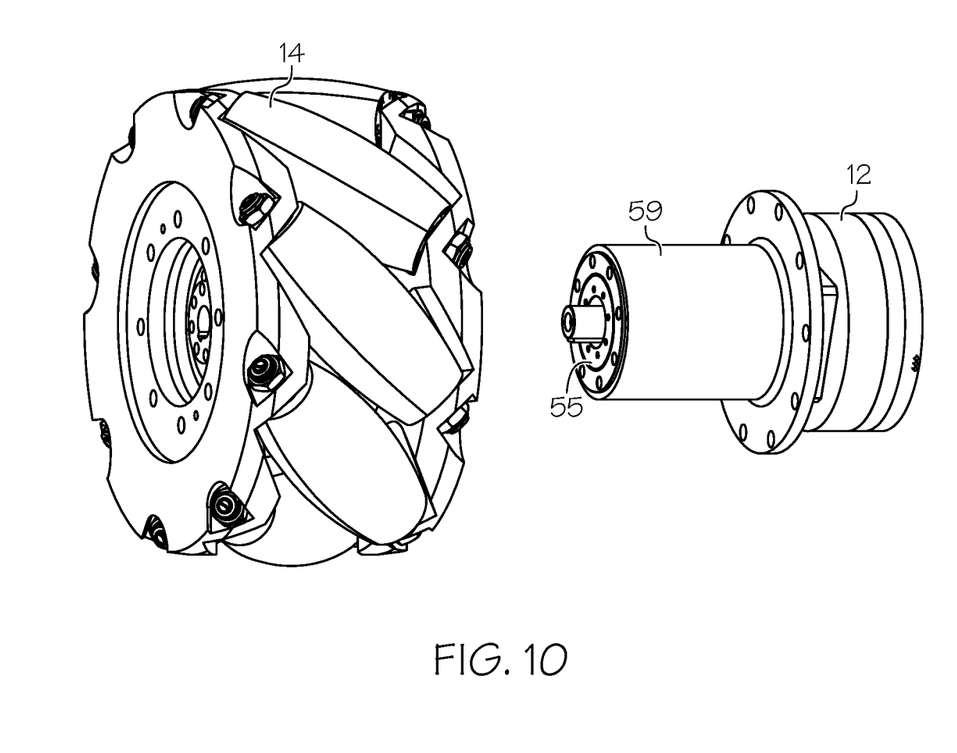
FIG. 10 shows how the drivetrain is partially embedded into the wheel.

FIG. 10 shows how the drivetrain is partially embedded into the wheel. the crossed roller bearing is shown at 55, the drivetrain hub is shown at 59 and the frameless servo motor is shown at 12. The crossed roller bearing and drivetrain are partially embedded in the wheel 14.

Figure 11:
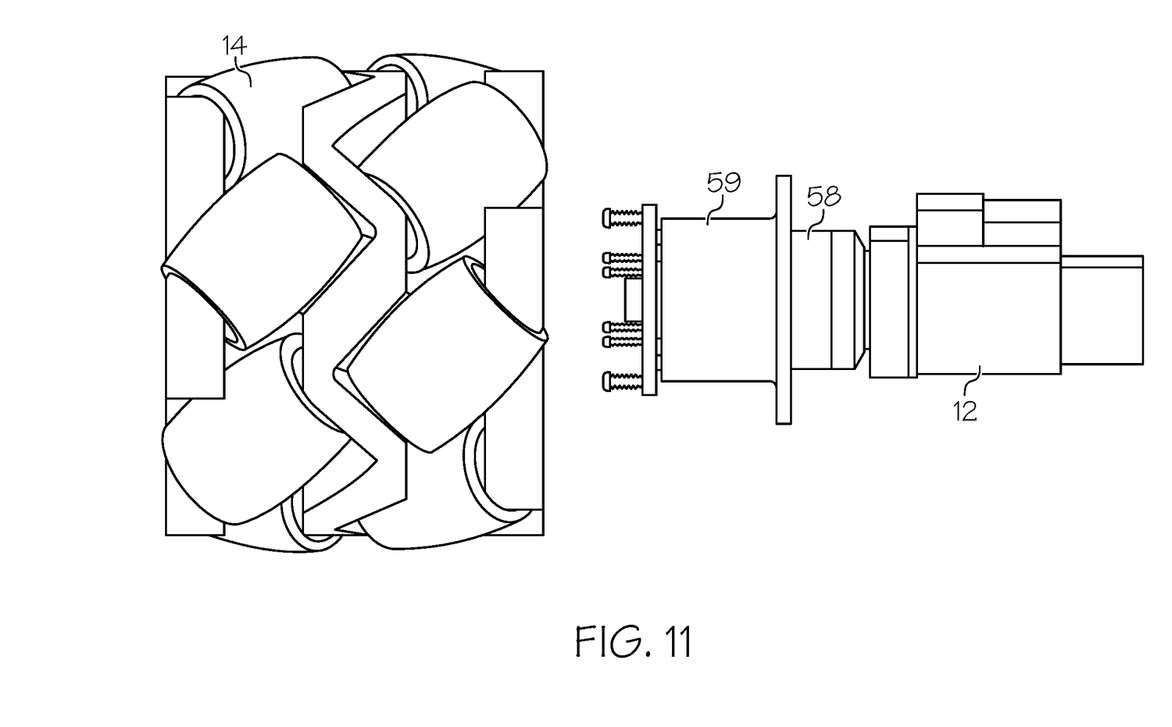
FIG. 11 shows how the drivetrain is partially embedded into the wheel.

FIG. 11 shows how the drivetrain is partially embedded into the wheel. The drivetrain hub is shown at 59, the gearbox is shown at 58 and the servo motor is shown at 12.

Figure 12:
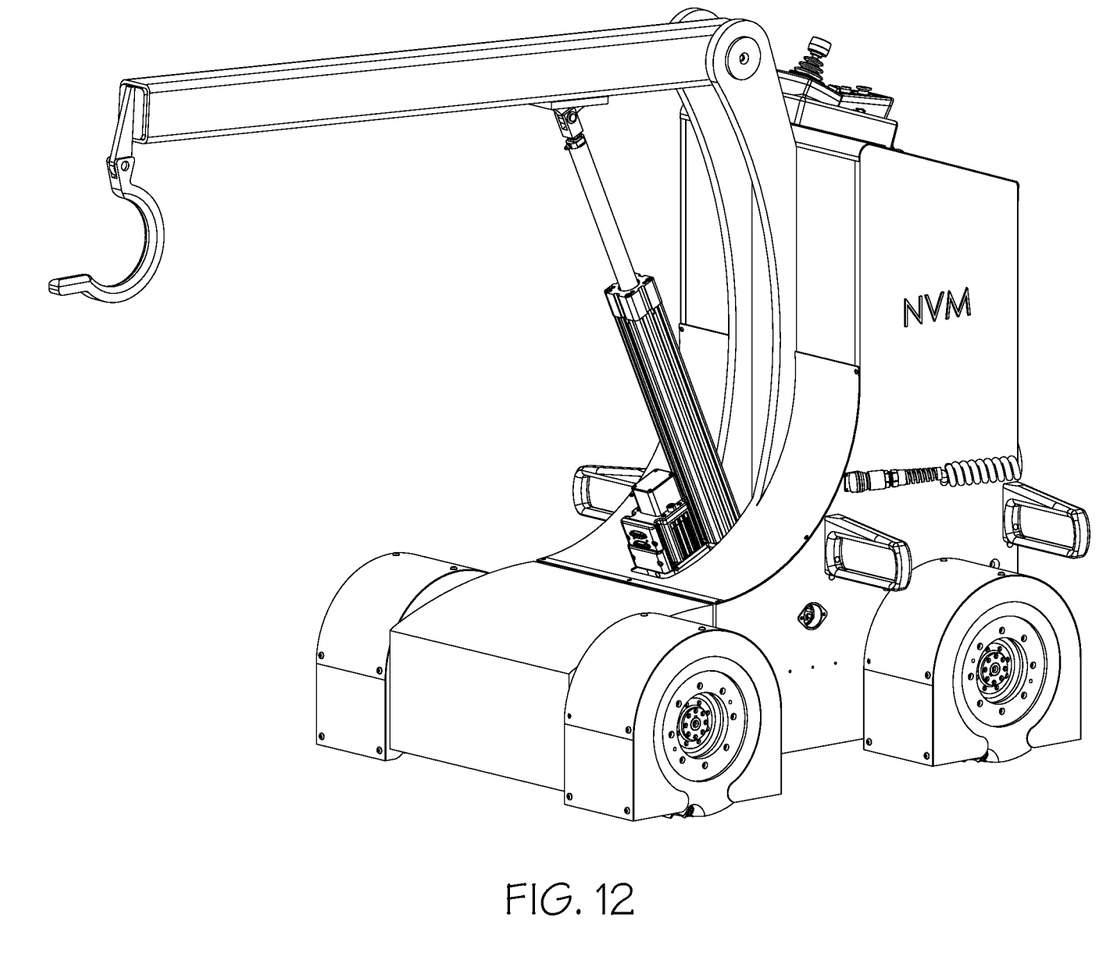
FIG. 12 shows a front and side perspective view of the jib hoist embodiment, with the jib rail in the down position.

FIG. 12 shows a front and side perspective view of the jib hoist embodiment, with the jib rail in the partially down position.

Figure 13:
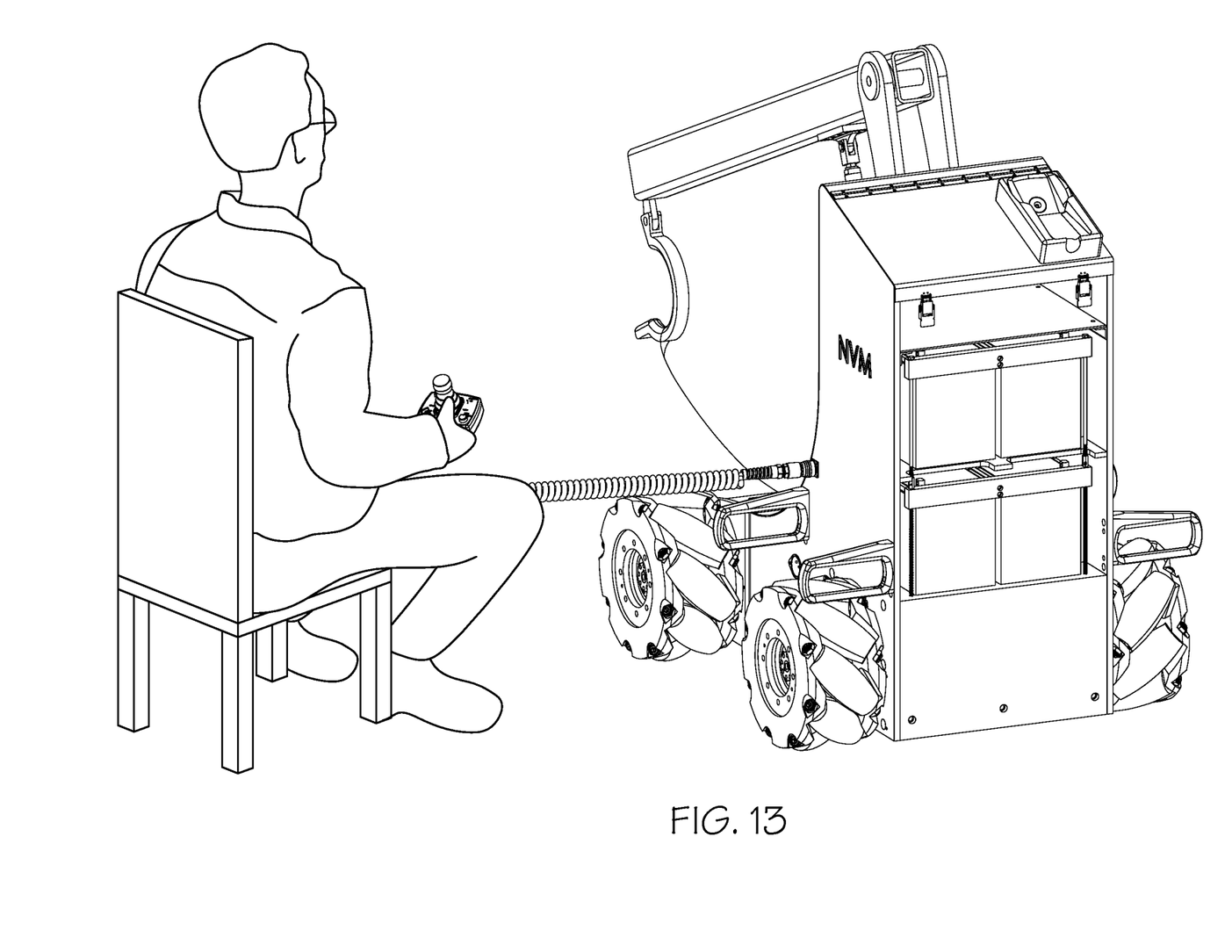
FIG. 13 shows an operator using the tethered pendant controller to operate the jib hoist.

FIG. 13 shows an operator using the tethered pendant controller to operate the jib hoist.

Figure 14:
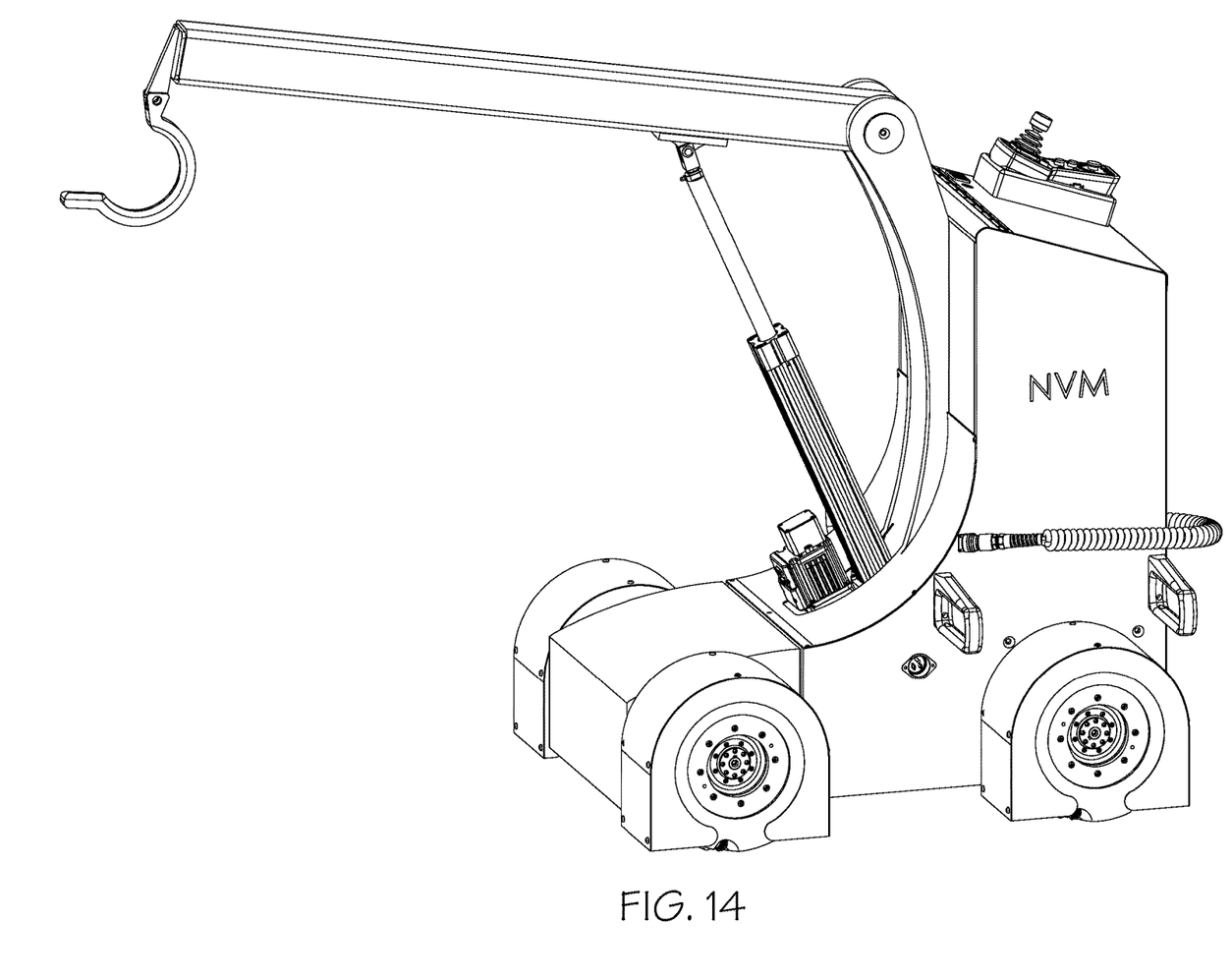
FIG. 14 shows a side view of the jib hoist with the jib rail partially raised.

FIG. 14 shows a side view of the jib hoist with the jib rail partially raised.

Figure 15:
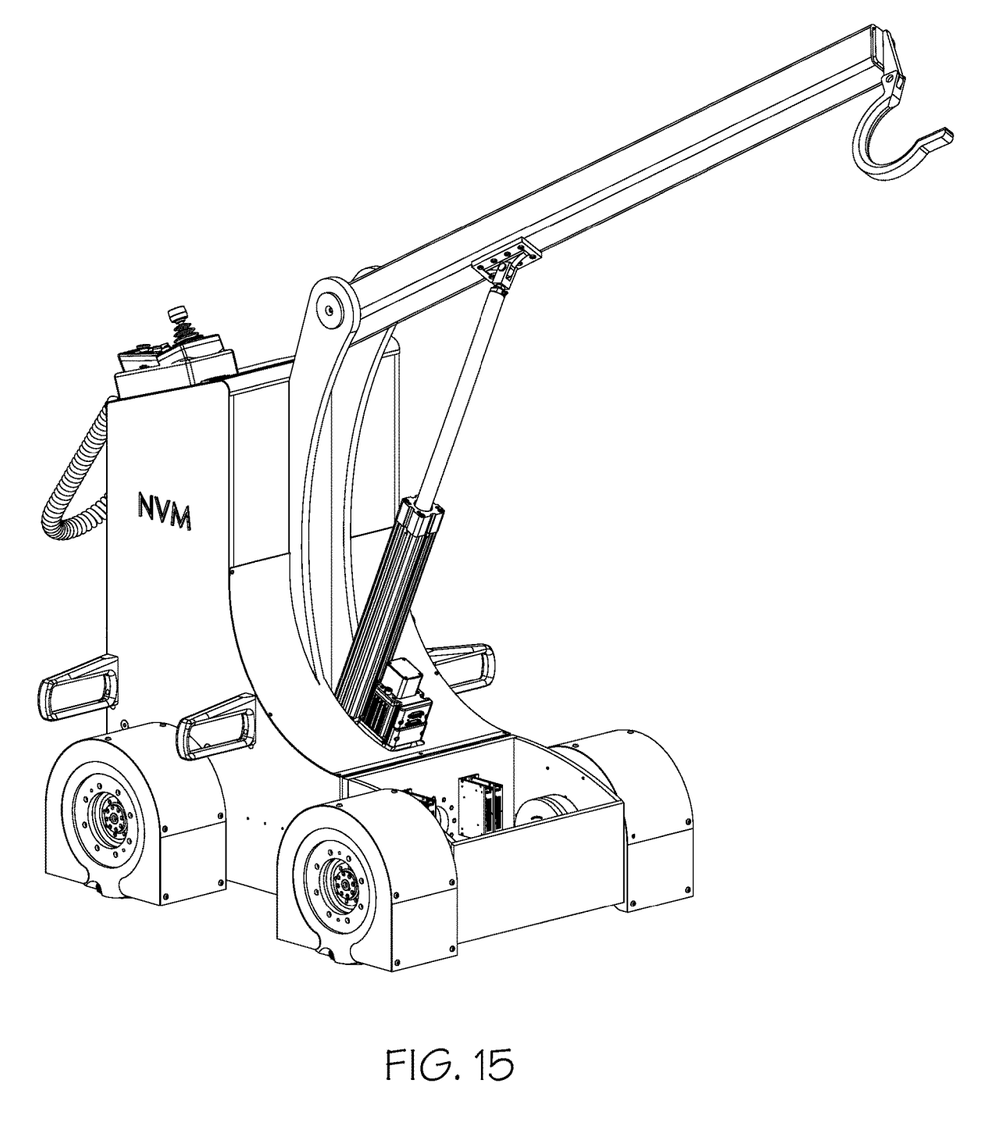
FIG. 15 shows a view of the jib hoist with the hook in its maximum height position.

FIG. 15 shows a view of the jib hoist with the hook in its maximum height position.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A mobile omnidirectional device comprising:
   a base support;
   a jib hoist connected to the base support;
   four wheels pivotally connected to the base support, each wheel being driven by a drive motor;
   a controller for individually controlling each of the drive motors, and
   a power source for powering the controller and the drive motors.

2. The mobile omnidirectional device of claim 1 wherein the wheels are constructed and arranged so that the mobile omnidirectional device has a turning radius of zero degrees.

3. The mobile omnidirectional device of claim 2 wherein the power source is comprised of a plurality of batteries.

4. The mobile omnidirectional device of claim 3 further including a battery recharger, which can be connected to an AC power source to recharge the plurality of batteries.

5. The mobile omnidirectional device of claim 1 further including a tethered control pendant connected to the controller for operating the mobile omnidirectional device.

6. The mobile omnidirectional device of claim 1 further including a receiver connected to the controller for operatively receiving operating commands from a wireless control device, for operating the mobile omnidirectional device.

7. A mobile omnidirectional device comprising:
   a base support;
   four wheels pivotally connected to the base support, each wheel being driven by a drive motor;
   a controller for individually controlling each of the drive motors;
   a power source for powering the controller and the drive motors;
   further wherein the wheels are constructed and arranged so that the mobile omnidirectional device has a turning radius of zero degrees;
   a jib column attached to the base support;
   a pivotally attached jib rail connected to the jib column which is raised and lowered with a roller screw actuator;
   the controller operably connected to the roller screw actuator to control the jib rail and jib column.

8. The mobile omnidirectional device of claim 7 wherein the device is sized to be portable, having a width of approximately 38.5 inches, a length of approximately 58 inches and a height of approximately 50 inches.

9. The mobile omnidirectional device of claim of claim 8 wherein the device weighs approximately 1750 pounds.

10. The mobile omnidirectional device of claim of claim 7 wherein the power source is four deep cycle batteries, which provide 48 VDC.

11. The mobile omnidirectional device of claim of claim 7 wherein the controller is operated by a tethered control pendant.

12. The mobile omnidirectional device of claim of claim 7 wherein the controller is operated by a wireless control device.

13. The mobile omnidirectional device of claim of claim 7 wherein the turning radius of the device is 0 inches.

14. The mobile omnidirectional device of claim 7 further including:
    a height adjustable platform, operatively connected to the controller to raise and lower the platform.

15. The mobile omnidirectional device of claim 14 wherein the device is sized to be portable, having a width of approximately 24 inches, the height adjustable platform can adjust in height from 18 to 24 inches, and the platform can adjust its height from end to end approximately ½ inch to maintain a level platform, and the platform can carry a load of at least 2500 lbs.

16. The mobile omnidirectional device of claim of claim 15 wherein the device weighs approximately 900 pounds.

17. The mobile omnidirectional device of claim of claim 15 wherein the power source is four deep cycle batteries, which provide 48 VDC.

18. The mobile omnidirectional device of claim of claim 15 wherein the controller is operated by a tethered control pendant.

19. The mobile omnidirectional device of claim of claim 15 wherein the controller is operated by a wireless control device.

\* \* \* \* \*